US005889974A

United States Patent [19]

Harriman et al.

[11] Patent Number: 5,889,974

[45] Date of Patent: Mar. 30, 1999

[54] METHOD AND APPARATUS FOR THE DETECTION OF REORDERING HAZARDS

[75] Inventors: David J. Harriman; Robert N. Murdoch, both of Sacramento, Calif.

[73] Assignee: Intel Corporation, Santa Clara, Calif.

[21] Appl. No.: 774,516

[22] Filed: Dec. 30, 1996

[51] Int. Cl.$^{6}$ .............................. G06F 11/28; G06F 13/00

[52] U.S. Cl. .......................... 395/394; 395/395; 395/391; 395/800.23; 395/800.38; 711/117; 711/122

[58] Field of Search .................................... 395/391, 393, 395/183.01, 394, 800.23, 800.38; 711/117, 122

[56] References Cited

U.S. PATENT DOCUMENTS

| | | | |
|---|---|---|---|
| 5,471,598 | 11/1995 | Quattromani et al. | 395/394 |
| 5,481,683 | 1/1996 | Karim | 395/393 |
| 5,488,729 | 1/1996 | Vegesna et al. | 395/391 |
| 5,584,009 | 12/1996 | Garibay, Jr. et al. | 711/117 |
| 5,630,149 | 5/1997 | Bluhm | 395/393 |
| 5,673,425 | 9/1997 | Iwashita | 395/183.01 |

*Primary Examiner*—Parshotam S. Lall
*Assistant Examiner*—Philip B. Tran
*Attorney, Agent, or Firm*—Blakely, Sokoloff, Taylor & Zafman LLP

[57] ABSTRACT

In a computer system processing out of order commands, a method for detecting situations in which errors could be caused by execution of an out of order command. The method includes the steps of receiving a first address of a first type and receiving a next address of the first type. Information is accumulated regarding differences between the first address and the next address. The method also includes receiving an address of a second type and using the accumulated information to determine whether the address of the second type is an address associated with a command whose execution can create a hazard. A hazard indication is generated if it is determined that the address of the second type is an address associated with a command whose execution can create a hazard. In one embodiment, the first type of address is an address associated with a first type of command and the second type of address is an address associated with a second type of command. In another embodiment, the first type of command and the second type of command are the same type of command.

50 Claims, 3 Drawing Sheets

Processor 222
100
System Core Logic 102
AGP Scheduler Unit 112
AGP Command Processing 116
AGP Master 108
AGP Interface 110
Raw Hazard Detection Unit 120
Other Command Processing 118
DRAM Controller 114
DRAM 106
BUS 104

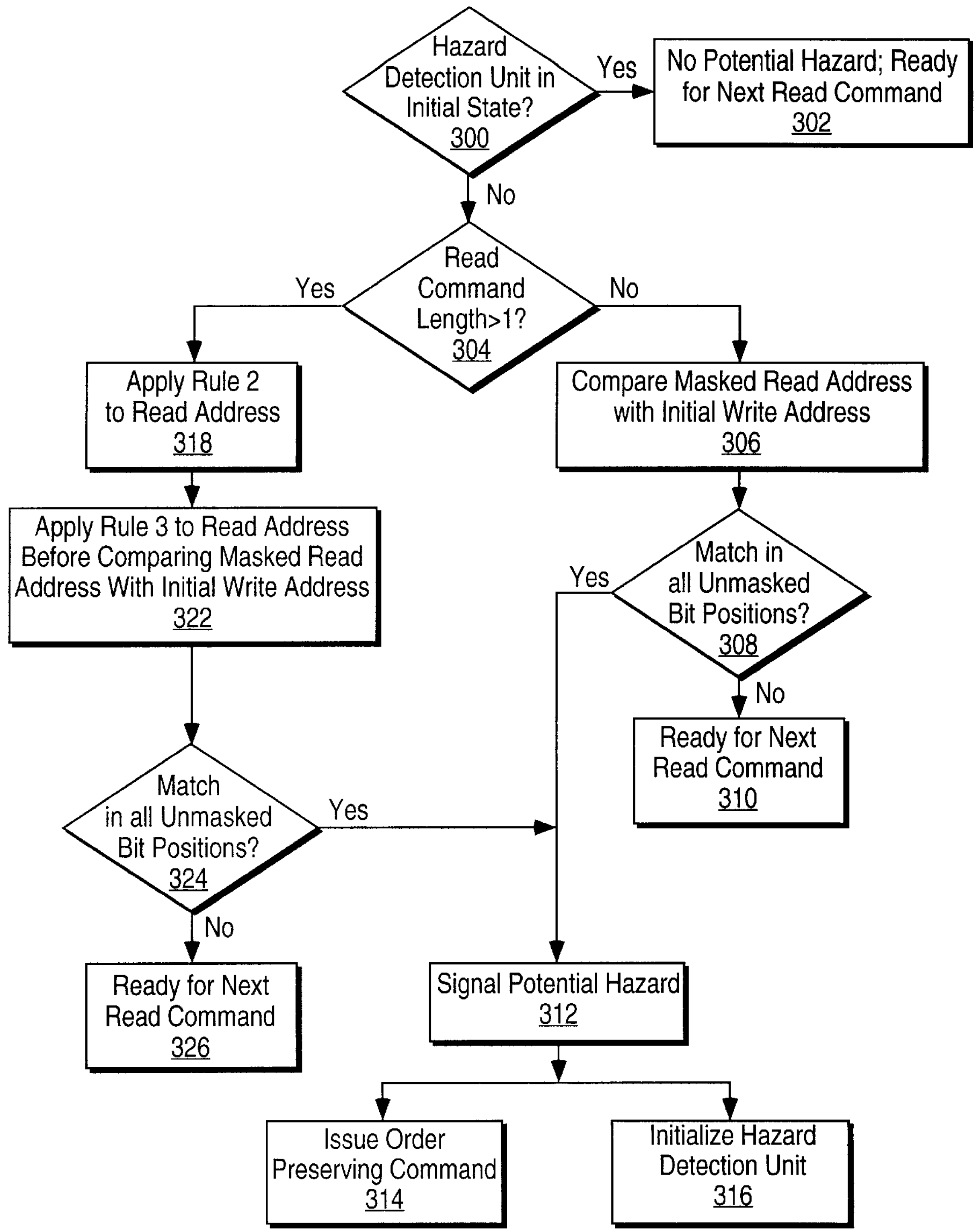
FIG. 3
Hazard Detection Unit in Initial State? 300
Yes
No Potential Hazard; Ready for Next Read Command 302
No
Read Command Length>1? 304
Yes
No
Apply Rule 2 to Read Address 318
Compare Masked Read Address with Initial Write Address 306
Apply Rule 3 to Read Address Before Comparing Masked Read Address With Initial Write Address 322
Yes
Match in all Unmasked Bit Positions? 308
No
Ready for Next Read Command 310
Match in all Unmasked Bit Positions? 324
Yes
No
Ready for Next Read Command 326
Signal Potential Hazard 312
Issue Order Preserving Command 314
Initialize Hazard Detection Unit 316

METHOD AND APPARATUS FOR THE DETECTION OF REORDERING HAZARDS

FIELD OF THE INVENTION

The present invention relates to the field of computer systems and more particularly to computer systems in which commands are executed out of order.

BACKGROUND OF THE INVENTION

In typical computer systems a processor, dynamic random access memory (DRAM) controller, or similar apparatus executes commands. Execution usually involves performing some operation on data that is stored in a memory location and referenced using an address. For various reasons, for instance to increase the rate at which a processor can execute commands, commands may be scheduled by a computer system to be executed in a different order than the order in which they were issued. Out of order execution can improve system performance but also introduces the possibility of errors. For example, when a read command is scheduled to be executed out of order in advance of a write command that originally preceded it, the data read upon execution of the read command may not be the correct data. This is because the write command that was supposed to have placed the correct data at a particular address to be read by the read command has not been executed. This type of error is a read after write (RAW) error. Whenever a read command involving an address is scheduled ahead of a write command involving the same address a RAW hazard exists. In other words, it is possible that the RAW error may occur, but not certain.

Write after read (WAR) and write after write (WAW) hazards can also be created by scheduling commands for execution out of order (reordering). Read after read (RAR) hazards can also exist in a system in which read operations have side effects. Depending upon the type of task being accomplished by the command and the type of processing system, not all types of hazards may actually threaten the integrity of data. For example, for some tasks writes may never be reordered. Therefore, it is not always necessary to identify each type of hazard.

Prior methods of detecting reordering hazards typically require that a list of addresses be maintained for all outstanding commands and that an address associated with a new command be compared against the list. This method requires a great deal of hardware, the amount of hardware may be expressed as O(n*m) where n is the address width and m is the number of outstanding commands. If the number of outstanding commands is large, this method requires a prohibitively expensive amount of hardware. In fact, such systems are usually restricted to having no more than eight commands outstanding. The complexity and size of prior reordering hazard detection systems are further increased if commands may span multiple units of address. When a command is received it typically includes both an address and a length, where the length indicates a number of addressing units whose first addressing unit begins with the address included in the command. Addressing units may vary with particular systems or applications. For example, an addressing unit may refer to a word of 16 bits or a quad word of 64 bits. When a command indicates multiple addressing units, a hazard detection system must account for each address not explicitly stated. With prior methods this causes the amount of hardware to be increased to O(n*m*1), where 1 is the maximum command address span. If some false positive indications are acceptable, the hardware requirements may be reduced somewhat. In this situation hazards may be indicated where they do not actually exist. This is somewhat undesirable because when hazards are detected, system operation is slowed by the system taking steps to prevent commands from being reordered around the hazardous command. For some systems or applications, however, a number of false positive indications will not impact performance.

Even systems that can tolerate some false positive indications may still be unable to use prior hazard detection methods if large numbers of outstanding commands may exist. What is needed is a method for detecting reordering hazards that is not dependent on the number of outstanding commands and that requires only a small amount of additional hardware.

The present invention provides a method and apparatus for detecting reordering hazards for a target application that can tolerate some false positive indications. The present invention also includes methods for reducing the number of false positive indications. In one embodiment, the present invention includes two registers each large enough to accommodate an address. A first register stores an address associated with an initial write command. A second register accumulates information about addresses associated with subsequent write commands. The contents of the second register are used to mask an address associated with a read command before it is compared with the contents of the first register to determine if reordering hazards may occur.

In another embodiment, the present invention includes one register that can store at least 3 states in each position corresponding to each bit of an address. One state indicates that a bit of an address associated with a read command matches a corresponding bit of an address associated with an initial write command if the bit is a one. Another state indicates there is a match if the bit is a zero. Finally, a third, "force" state indicates that there is a match regardless of the state of the bit.

The present invention requires less hardware than traditional methods of hazard detection when more than two outstanding commands are considered. In addition, the present invention can detect reordering hazards more quickly and therefore allows for faster system operation. This is because the present invention only requires one address comparison whereas the prior method requires a comparison to be made for each address outstanding.

SUMMARY OF THE INVENTION

In a computer system processing out of order commands, a method for detecting situations in which errors could be caused by execution of an out of order command is described. The method includes the steps of receiving a first address of a first type and receiving a next address of the first type. Information is accumulated regarding differences between the first address and the next address. The method also includes receiving an address of a second type and using the accumulated information to determine whether the address of the second type is an address associated with a command whose execution can create a hazard. A hazard indication is generated if it is determined that the address of the second type is an address associated with a command whose execution can create a hazard. In one embodiment, the first type of address is an address associated with a first type of command and the second type of address is an address associated with a second type of command. In another embodiment, the first type of command and the second type of command are the same type of command.

BRIEF DESCRIPTION OF THE DRAWINGS

FIG. 3 is a block diagram according to one embodiment.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well known methods, procedures, components, and circuits have not been described in detail in order to avoid obscuring the present invention.

The present invention will be described with reference to a computer system performing out of order commands from an accelerated graphics port (A.G.P.) master. In an accelerated graphics application such as the one used as an example herein, only RAW hazards need to be detected. The present invention is equally applicable to applications other than accelerated graphics applications and to the detection of reordering hazards other than RAW hazards.

Figure 1:
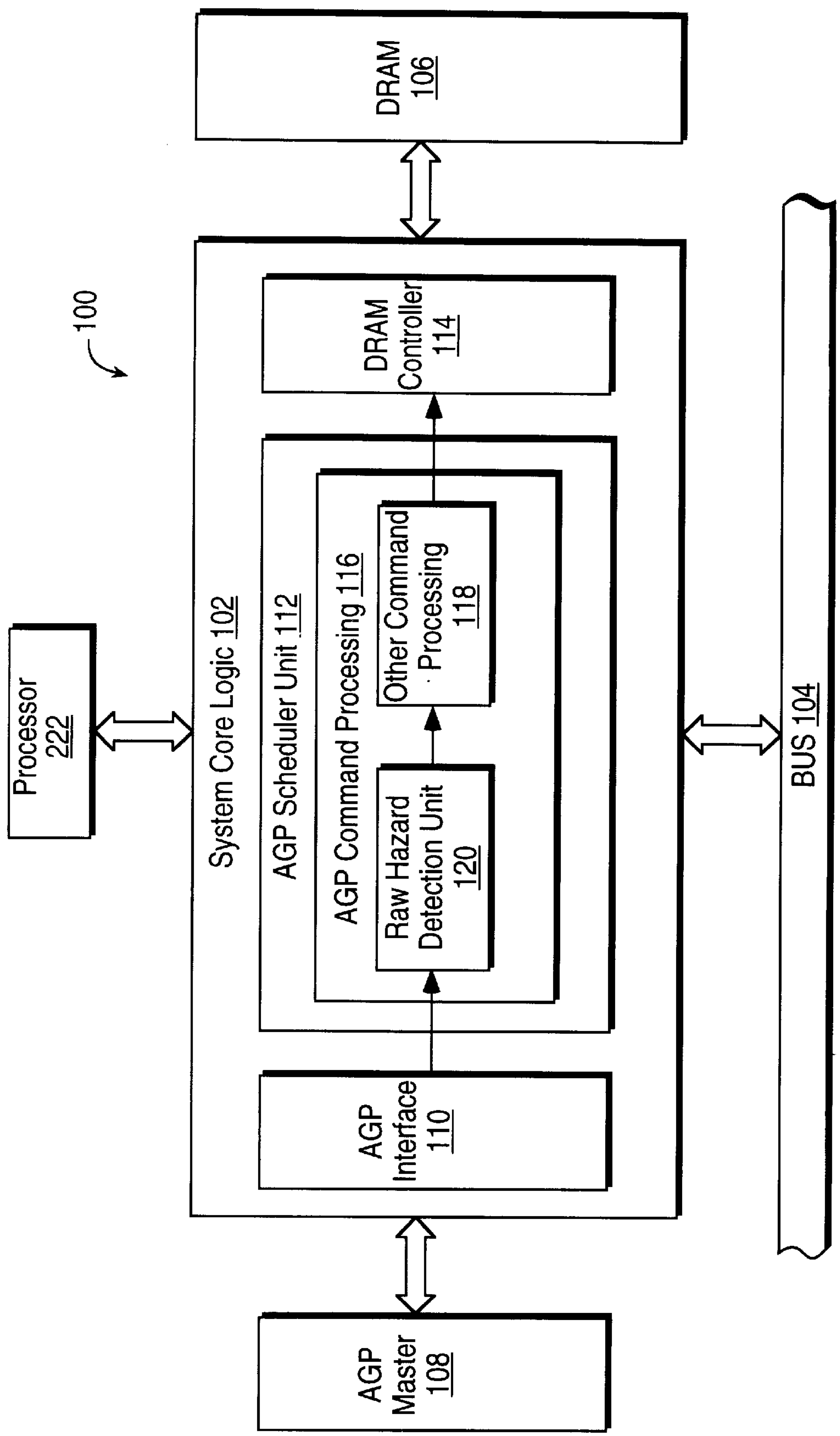
FIG. 1 is a block diagram of a computer system of one embodiment.

FIG. 1 is a block diagram of computer system 100 according to one embodiment of the present invention. Computer system 100 includes processor 222. Processor 222 includes hardware for processing commands, including an arithmetic and logic unit (not shown). Processor 222 is connected to bus 104 through system core logic 102. System core logic 102 includes various components required to perform specific system operations. In this embodiment an accelerated graphics function is performed by computer system 100. A.G.P. master 108 is coupled to system core logic 102. Commands from A.G.P. master 108 are received by A.G.P. interface 110 and transmitted to A.G.P. scheduler unit 112. A.G.P. scheduler unit 112 includes A.G.P. command processing circuitry 116. A.G.P. command processing unit 116 processes commands from A.G.P. master 108 and communicates with dynamic random access memory (DRAM) controller 114. DRAM 106 stores data comprising operands for use in the execution of commands by processor 222 and also results of operations performed by processor 222. Data in DRAM 106 is stored according to addresses of memory locations.

A.G.P. command processing unit 116 includes RAW hazard detection unit 120. A.G.P. command processing unit 116 precedes command processing circuitry 118 which processes other aspects of commands not having to do with the detection of hazards.

Figure 2:
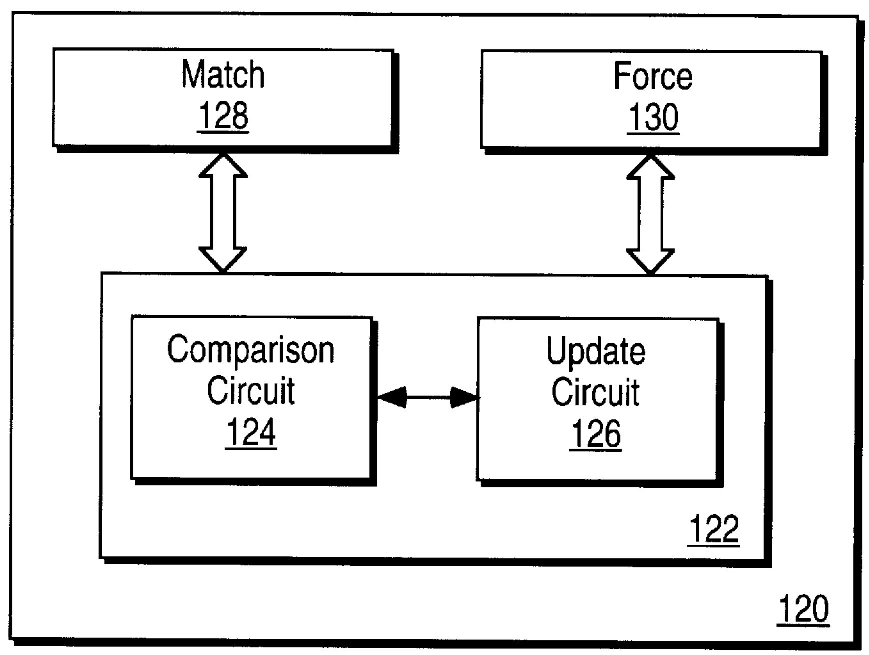
FIG. 2 is a block diagram of a hazard detection unit of one embodiment.

FIG. 2 is a block diagram of RAW hazard detection unit 120. RAW hazard detection unit 120 includes match register 128 and force register 130. Match register 128 stores an address associated with an initial write command. Force register 130 stores information regarding the difference between addresses associated with subsequent write commands and the address stored in match register 128. The data stored in force register 130 is used to mask an address associated with a read command before comparing it with the address in match register 128. The comparison determines whether a potential RAW hazard exists. This process will be described more fully below.

Hereafter, "write address" is used to indicate an address associated with a write command. In other words, "write address" is used as the address included in a write command itself, rather than an address at which the write command can be found. Similarly, "read address" is used herein to indicate an address associated with (contained in) a read command.

In other embodiments, one register is used in place of registers 128 and 130. The register stores three states for each bit position of an address. One state indicates that a bit of a read address matches a corresponding bit of an initial write address if the bit is a one. Another state indicates that the bit matches if it is a zero. A third state forces a match regardless of the state of the bit of the read address.

RAW hazard detection unit 120 also includes control circuitry 122 comprising comparison circuit 124 and update circuit 126. Comparison circuit 124 performs comparisons between an initial write address and subsequent write addresses as well as comparisons between masked read addresses and the initial write address. Update circuitry 126 changes the information stored in force register 130 as required and also resets both registers upon initialization of RAW hazard detection unit 120.

The present invention detects potential RAW hazards by accumulating information about write addresses that have been received by A.G.P. scheduler unit 112. By accumulating information about received write addresses rather than storing a series of write addresses, much less hardware is required than with prior methods. This embodiment of the present invention will be described with reference to specific examples as illustrated in Tables 1–3. In this embodiment, a command from A.G.P. master 108 includes both a single address and an indication of length. The indication of length states how many addressing units are involved in the particular command. In this embodiment, an addressing unit is a quad word, or 64 bits. In other embodiments an addressing unit could include more bits or less bits. For example, if a write command included an address and a length of four, the write operation is understood to involve the stated address in addition to three addresses which follow the stated address in sequence.

TABLE 1

| Operation | Length | Match/Force Register | Explanation |
|---|---|---|---|
| initial state | | 0 0 0 0 0 0 | Registers Initialized |
| W110101 | 1 | 1 1 0 1 0 1 | 1st write address match each bit |
| W110001 | 1 | 1 1 0 f 0 1 | differing bits set to "force" match |
| | | Rule 1 | |

Referring to Table 1, an example of the situation in which subsequent write operations, each of length 1, are received by RAW hazard detection unit 120.

In Tables 1–3, the values of force register 130 and match register 128 are shown together in one field for clarity. In the preferred embodiment of the invention, there are two, separate registers. A "match" register stores an initial write address. A "force" register accumulates information regarding subsequent write addresses. In the match/force register shown in the tables, the symbols "1" and "0" indicate binary values in the match register. The symbol "f" represents an overriding value in the force register indicating that a bit in that position should be determined to match regardless of its value. An "f" is inserted in a bit position if a bit occupying that position in a subsequent write address differs from a corresponding bit of the initial write address. In an alternate embodiment of the invention, a single register capable of storing at least three distinct values for each storage position is used.

In an initial state both match register 128 and force register 130 contain all zeros. This is indicated by zeroes in all bit positions of the match/force register. As shown in Table 1, for this example the match/force register includes 6 bits. Six bits are shown for simplicity, however many more bits are typically used for an actual address. The preferred embodiment of the present invention includes an address of 29 bits in length. The next operation in Table 1 after the initial state is a write operation wherein a write command is received with an address of 110101 and length 1. The address represents an initial write address. Table 1 shows that at this point the match/force register contains the initial write address 110101. This is to indicate that if a read address were received at this point each actual bit of the read address would be compared with a corresponding bit of the address as shown in the match/force register.

Force register 130 at this point contains all zeroes to indicate that each bit of a read address should be compared with a corresponding bit of the write address. The contents of match register 128 at this point are the same as the contents of the match/force register in Table 1.

The next operation in Table 1 indicates the receipt of a write command with an address of 110001 and length 1. This address represents a first subsequent write address following the initial write address. After receipt of this subsequent address the contents of match register 128 are unchanged. The subsequent address is compared to the contents of match register 128 by comparison circuit 124. The two addresses differ in the third bit from the right, or the third least significant bit. Update circuitry 126 then updates the force register accordingly. According to the notation of Table 1, the contents of the match/force register are shown to be 110f01. This indicates that the third least significant bit of the read address will be determined to match the corresponding bit of the initial write address regardless of the actual state of that bit in the read address. Force register 130 would at this point contain 000100, where the 1 would indicate that a match was to be forced in that bit position. Tables 2 and 3 will continue the notation as described with respect to Table 1.

Table 1 represents Rule 1 that is applied to incoming write addresses. According to this embodiment Rules 1, 2, and 3 as illustrated in Tables 1, 2, and 3, are each applied in sequence to each incoming write address.

TABLE 2

| Operation | Length | Match/Force Register | Explanation |
|---|---|---|---|
| W100000 | 4 | 1 0 0 0 f f | set to "force" the number of bits to the right of the highest bit set in binary length: length 4 -> 100 -> ff |
| | | Rule 2 | |

Referring now to Table 2, Rule 2 will be described. Rule 2 refers to the situation in which a write command is received that includes a write address and a length greater than 1. As shown in Table 2, a write address of 100000 is received with a length of 4 indicating four addressing units, or in this embodiment four quad words. In Table 2 the write operation shown represents an initial write operation. The state of the match/force register is the state of the register after receipt of the initial write address 100000. The 2 lower (least significant bits) of the force register are set to force because the length of the write command is 4. In this embodiment the length of the write operation in binary is examined to determine which bits of the force register to set to f. For example, for a length of 4, the binary length is 100. Thus, any bits to the right of the highest bit set in the length 100 are set to f. As a result, any read address with upper four bits 1000 will be determined to match the initial read address (and indicate a hazard) regardless of the states of the lower two bits of the read address.

TABLE 3

| Operation | Length | Match/Force Register | Explanation |
|---|---|---|---|
| W101111 | 2 | 0 f f f f f | add (length −1) to 101111; carry bits are 011110 -> set to "force" all bit positions in the reg occupied by "1"s in the carry result AND from rule 2: length 2 -> 10; set lsb of the reg. to "force" |
| | | Rule 3 | |

Table 3 illustrates Rule 3 which applies to the situation in which a write command is issued with a length greater than 1. Here, if the write operation were expanded to include separate addresses for each length, extra bits would be forced to toggle in addition to the bits set to f by Rule 2. As shown in Table 3, a write command includes an initial write address of 101111 and length 2. As stated above, Rules 1, 2, and 3 are applied in sequence to each write address received. The results of applying Rules 1–3 are cumulative. In certain situations different rules may cause different bits of the force register to be set to f. In the example of Rule 3 shown in Table 3 such a situation is illustrated. After application of Rule 2 to the initial write address shown in Table 3, the least significant bit or the rightmost bit was set to f. However, because of the particular initial write address, Rule 2 did not provide an adequate address mask for the force register. This is because the address following the initial write address of Table 3 in sequence is 110000. In other words, more bits have toggled than were accounted for by Rule 2.

According to this embodiment the initial write address in Rule 3 is added to the length minus 1 and the resulting carry bits are examined. In this case the resulting carry bits are 011110. According to Rule 3 all bit positions of the force register corresponding to a 1 in the carry are set to f. After application of Rules 2 and 3 to the initial write address of Table 3, the contents of the match/force register are 0fffff. So this example represents the situation in which both Rule 2 and Rule 3 are applied and each rule causes bits of the force register to be set to f.

According to the present invention as described, false positive indications can occur. That is, RAW hazards may be indicated when they will not actually occur. For example, referring to the example of Table 3, two write addresses were accounted for in the configuration of the match/force register. However, the two addresses differ in five bit positions, causing five bits of the match/force register to be set to force. A later-received read may actually differ in one of the bit positions corresponding to a force bit in the match/force register without actually addressing either of the two locations written. Nevertheless, a hazard will be indicated even though an actual hazard only exists if every bit of the read address matches a previously received write address.

As write addresses continue to be received, more force bits accumulate in the force register. For this reason, the likelihood of false positive indications increases over time. This embodiment reduces false hazard indications by resetting match register 128 and force register 130 to an initial state under certain conditions. The registers are reset when there are no write commands outstanding. When no write commands are yet to be processed, no danger of a RAW hazard exists. The registers are also reset when the system processes a command that disallows reordering around it. Finally, the match register and the force register are reinitialized when a potential RAW hazard is detected. In this embodiment, when a potential RAW hazard is detected, an order preserving command is issued to block the hazard and the RAW hazard detection unit is reset. Order preserving commands do not allow execution of a particular command until other commands upon which it depends are executed. For example, in this embodiment a read command that provoked a RAW hazard indication would be held for execution until each write command it depended upon was executed.

Read commands as well as write commands can include lengths of more than one addressing unit. For this reason it is necessary to take multiple read addresses into account when detecting potential RAW hazards. In this embodiment the length of read commands is accounted for in the same way the length of write commands is accounted for. Read commands with lengths greater that 1 are processed by subjecting them to Rules 2 and 3. The difference in processing between read commands and write commands is that information resulting from Rules 2 and 3 with respect to read commands is not accumulated or stored. In embodiments in which read commands are guaranteed not to occur simultaneously with write commands the same hardware used for calculating the register updates for writes may be used to account for multiple address read operations. Specifically, control circuitry 122 can be used. For a read operation, after Rules 2 and 3 are applied, the resulting information regarding force bits is used once when the masked read address is compared to the address in the match register. The information is not stored.

FIG. 3 is a flow chart showing the sequence of events that occur when a read command is received by A.G.P. scheduler unit 112. Typically, steps of FIG. 3 correspond to states of a state machine or other device with storage capability. At step 300 it is determined whether or not RAW hazard detection unit 120 is in an initial state. If RAW hazard detection 120 is in an initial state no potential hazard can exist. As shown at step 302, RAW hazard detection unit 120 is then ready to receive the next read command. If RAW hazard detection unit 120 is not in an initial state, at step 304 it is determined whether the read command has a length greater than 1. If the read command does not have a length greater than 1, at step 306 the read address masked with the data from the force register is compared to the initial write address in the match register. At step 308 if a match is found in all bit positions not covered by the mask, then the process proceeds to step 312 where a potential RAW hazard is signaled. When a potential RAW hazard is signaled, a command is issued preserving the order of command execution in step 314, and in addition, hazard detection unit 120 is initialized at step 316.

Referring again to step 304, if the read command is determined to have a length greater than 1, then Rule 2 is applied to the read address at step 318. Next, at step 322 Rule 3 is applied to the read address before comparing the masked read address with the address in the match register. At step 324 it is determined whether the masked read address matches the address in the match register in all unmasked bit positions. If a match is found, a potential RAW hazard is signaled at step 312, and steps 314 and 316 are performed. If a match is not found at step 324, then at step 326 RAW hazard detection unit 120 is ready to receive a next read command.

In the foregoing specification, the invention has been described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than an restrictive sense.

What is claimed is:

1. In a computer system processing out of order commands, a method for detecting situations in which errors could be caused by execution of an out of order command, comprising the steps of:

receiving a first address of a first type;

receiving a next address of the first type;

comparing the first address of the first type and the next address of the first type to determine differences between the first address and the next address;

accumulating information indicating the differences between the first address and the next address;

receiving an address of a second type; and using the accumulated information to determine whether the address of the second type is an address associated with a command whose execution can create a hazard.

2. The method of claim 1, wherein the first type is an address associated with a first type of command and the second type is an address associated with a second type of command.

3. The method of claim 2, wherein the first type of command and the second type of command are a same type of command.

4. The method of claim 2, wherein the first type of command is a write command and the second type of command is a read command.

5. The method of claim 1, further comprising the steps of:

storing the first address in a first register; and accumulating the information in a second register.

6. The method of claim 5, wherein the first register and the second register are the same register.

7. The method of claim 1, further comprising the step of generating a hazard indication if it is determined that the address of the second type is associated with a command whose execution can create a hazard.

8. The method of claim 7, further comprising the step of disallowing command reordering in response to the hazard indication.

9. In a computer system processing out of order commands, a method for detecting situations in which errors could be caused by execution of an out of order command, comprising the steps of:

receiving a first address of a first type;

receiving a next address of the first type wherein each bit of the second address corresponds to a bit of the first address;

for each bit of the next address, accumulating a force value if the bit and a corresponding bit of the first address have different values, using the force values accumulated to mask an address of a second type; and comparing the masked address of the second type to the first address.

10. The method of claim 9, further comprising the step of, if all unmasked bits of the masked address match corresponding bits of the first address, generating a hazard indication.

11. In a computer system processing out of order commands, a method for detecting possible system errors, comprising the steps of:

writing an initial address associated with a first command of a first type into a first register;

initializing a second register to contain a first value for each bit position of the initial address;

comparing a subsequent address associated with a second command of the first type with the initial address;

for each bit that differs between the initial address and the subsequent address, accumulating a second value in a corresponding bit position of the second register;

using contents of the second register to mask an address associated with a command of a second type before comparing the address associated with the command of the second type to contents of the first register.

12. The method of claim 11, wherein the command of the first type is a write command and the command of the second type is a read command.

13. The method of claim 11, further comprising the steps of:

if unmasked bits of the masked address associated with the command of the second type are identical to corresponding bits in the first register, issuing a hazard indication; and clearing the first and the second registers.

14. The method of claim 11, further comprising the step of clearing the first and the second registers if a command is received that cannot be reordered around.

15. The method of claim 11, further comprising the step of clearing the first register and the second registers if no commands of the first type are outstanding.

16. The method of claim 11 wherein the second value indicates that a bit of an address associated with a command of the second type matches a corresponding bit of the first register regardless of the value of the bit of the address associated with the command of the second type.

17. The method of claim 16, wherein the first value indicates that bit of the address associated with the command of the second type is to be compared to the corresponding bit of the first register.

18. The method of claim 17, further comprising the steps of:

receiving a command of the first type, including a first associated address and a first number of addressing units; and if the number of addressing units is greater than one, writing the second value to all bit positions of the second register corresponding to bits that have a significance less than a significance of a highest bit set to one in a binary representation of the first number of addressing units.

19. The method of claim 18, further comprising the steps of:

writing the second value to a bit position in the second register corresponding to a bit of the first associated address that a same significance as a most significant bit differing between the first associated address and a last sequential address specified by the first number of addressing units; and writing the second value to each bit position in the second register corresponding to a bit of the first associated address that has less significance than the most significant bit differing between the first associated and the last sequential address specified by the first number of addressing units.

20. The method of claim 19, further comprising the steps of:

receiving a command of the second type, including a second associated address and a second number of addressing units;

if the number of addressing units is greater than one, creating a temporary value by setting to the second value a bit that has a same significance as a most significant bit differing between the second associated address and a last sequential address specified by the second number of addressing units and setting to the second value each bit that has less significance than the most significant bit differing between the second associated address and the last sequential address specified by the second number of addressing units;

using the temporary value with the contents of the second register to mask bits of the second associated address;

comparing the masked address to contents of the first register; and if each unmasked bit of the second associated address matches a corresponding bit of the first register, generating a hazard indication.

21. In a system processing out of order commands, a method for detecting error hazard situations, comprising the steps of:

receiving an initial write command to be processed by the system and writing an associated initial address into a first register;

writing a compare value into each bit position of a second register, wherein each bit position corresponds to a bit position of the first register;

receiving a subsequent write command to be processed by the system;

comparing an associated subsequent write address with the initial address and for each bit that differs, writing a force value into a bit position of the second register corresponding to a bit position of the differing bit;

receiving a read command to be processed by the system;

masking an associated read address with contents of the second register such that a bit of the read address masked by a force value will match any value and a bit masked by a compare value will match a same value;

comparing the masked read address with the first register; and issuing a hazard indication if each unmasked bit of the read address matches a corresponding bit of the first register.

22. The method of claim 21, wherein the initial write command and the subsequent write command include an indication of a range of write addresses, and wherein a force value is written into a bit position of the second register corresponding to a bit position of any address in the range of write addresses containing a bit that differs from a corresponding bit of the first register.

23. The method of claim 22, wherein the read command includes an indication of a range of read addresses, further comprising the steps of:

if the range of read addresses includes more than one read address, creating a temporary value indicating the force value for any bit position of the read address corresponding to a bit position of a differing bit of any address in the range of read addresses; and using the temporary value and the contents of the second register to mask the read address before comparing the read address to the contents of the first register.

24. A method for detecting hazard situations in which a computer system may process an out of order command using incorrect data, comprising the steps of:

initializing a hazard detection unit by resetting a match register and a force register;

receiving an initial write address and storing it in the match register;

receiving subsequent write addresses and comparing each with the initial write address;

changing the contents of the force register each time a difference occurs between the initial write address and a subsequent write address;

using the contents of the force register in comparing a read address to the initial write address such that a match is found if the read address matches any write address referenced by a previous write command; and issuing a hazard indication if a match is found.

25. The method of claim 24, wherein the initial write address and the subsequent write addresses are received with a length indication indicating a number of write addressing units, and wherein if the number of write addressing units is greater than one, the contents of the force register are changed to reflect any difference between the initial write address and any address in a range of addresses included in the number of write addressing units.

26. The method of claim 25, wherein the read address includes a length indication indicating a number of read addressing units, and wherein a match is found if any address in a range of addresses included in the number of read addressing units could match any write address referenced by a previous write command.

27. A computer system that processes out of order commands, comprising:

a processor;

a memory system coupled to the processor;

a master functional unit coupled to the processor that requires the processor to process out of order commands; and system core logic coupled to the processor, to the memory system and to the master functional unit, comprising:

interface circuitry that communicates with the master functional unit;

a memory controller that controls transfer of information to and from the memory system; and a scheduling unit that schedules commands received from the master functional unit, comprising:

a hazard detection unit that detects a hazard when an out of order command could operate on incorrect data, comprising:

a first register that stores an initial write address;

a second register that stores a compare mask, the compare mask comprising a bit for each bit of the initial address; and control circuitry coupled to the first register and to the second register that updates the compare mask each time a subsequent write address is received that is different form the initial write address and that uses the compare mask to mask a read address before comparison with the initial write address to determine whether a hazard is detected.

28. The computer system of claim 27, wherein the control circuitry comprises:

comparison circuitry that compares the subsequent write address with the initial write address and compares the masked read address with the initial write address; and update circuitry that updates the compare mask by changing a bit of the compare mask from a compare value to a force value when a bit of the subsequent write address does not match a bit of the initial write address.

29. The computer system of claim 28, wherein a write command scheduled by the scheduling unit includes a range of write addresses and wherein the update circuitry updates the compare mask for each write address in the range of write addresses that differs from the initial write address.

30. The computer system of claim 29, wherein the control circuitry issues a hazard indication causing the scheduling unit to schedule commands such that no command may be reordered around a command for which the hazard indication was issued, and wherein the control circuitry resets the first register and the second register when a hazard indication is issued.

31. The computer system of claim 30, wherein commands are received from the master functional unit with an indication that the commands cannot be executed out of order, and wherein when the scheduling unit receives the indication that the commands cannot be executed out of order, the control circuitry resets the first register and the second register.

32. The computer system of claim 31, wherein the control circuitry resets the first and second registers if there are no commands received from the master functional unit that have not been processed to a point at which no hazard can result from them.

33. In a computer system capable of processing commands out of order, a method for detecting situations in which out of order processing of commands could result in incorrect machine operation, comprising the steps of:

initializing a first register to an initial state;

receiving zero or more commands of a first type with associated addresses;

accumulating information regarding differences between addresses associated with consecutively received commands of the first type in a register;

receiving zero or more commands of a second type with associated addresses; and for each command of the second type, using the accumulated information to determine whether processing the command out of order may cause incorrect machine operation.

34. The method of claim 33, wherein the first type of command and the second type of command are a same type of command.

35. The method of claim 33, wherein the first type of command is a write command and the second type of command is a read command.

36. The method of claim 33, wherein a hazard indication is issued when it is determined that processing the command out of order may cause incorrect machine operation.

37. The method of claim 33, wherein an ordering instruction is issued when it is determined that processing the command out of order may cause incorrect machine operation.

38. The method of claim 37, wherein the register is reset to the initial state when the ordering instruction is issued.

39. The method of claim 33, wherein the register is reset to the initial state when an ordering instruction is received.

40. The method of claim 33, wherein the register is reset to the initial state when all outstanding operations of the first type are completed.

41. The method of claim 33, wherein the information accumulated includes elements of the addresses associated with the commands of the first type and an indication of which elements differ between the addresses associated with the received commands of the first type.

42. The method of claim 41, wherein the accumulated information is stored by:

initializing a second register such that all bit positions contain a first value;

storing an address associated with a first command of the first type received following the step of initializing the first register;

comparing subsequent addresses received with commands of the first type with contents of the first register; and for each element differing between the received subsequent address and the contents of the first register, storing a second value in a corresponding entry of the second register.

43. The method of claim 41, wherein the step of using the accumulated information includes the following steps:

determining that processing the command out of order may cause incorrect machine operation if elements of the addresses associated with the received commands of the first type that are common between all previously received commands of the first type match corresponding elements of the addresses associated with the command of the second type; and determining that elements of the addresses associated with the received commands of the first type that differ between the received commands of the first type match corresponding elements of the addresses associated with the commands of the second type without regard to values of the corresponding elements of the addresses associated with the commands of the second type.

44. The method of claim 33, wherein a command of the first type has an associated length indicating a number of addressing units.

45. The method of claim 44, further comprising the step of, if the associated length is greater than one, writing the second value to bit positions of the second register such that bit positions corresponding to all bits less significant than a binary value of the length are set to the second value.

46. The method of claim 45, further comprising the step of writing the second value to each bit position in the second register corresponding to a bit of an address associated with a command of the first type equal to or less in significance than a most significant bit differing between a first sequential address specified by the command of the first type and a last sequential address specified by the command of the first type.

47. The method of claim 46, wherein a command of the second type has an associated length indicating a number of addressing units.

48. The method of claim 47, further comprising the step of, when the length associated with the command of the second type is greater than one, creating a temporary mask wherein bit positions corresponding to all bit positions less significant than a binary value of the length are assigned the second value, and all other bit positions are assigned the first value.

49. The method of claim 48, further comprising the step of assigning the second value to each bit position of the temporary mask corresponding to a bit of an address associated with a command of the first type equal to or less in significance than a most significant bit differing between a first sequential address specified by the command of the first type and a last sequential address specified by the command of the first type.

50. The method of claim 49, further comprising the steps of:

for each bit position in the temporary mask which is assigned the first value, comparing a corresponding bit of the address of the command of the second type with the accumulated information about received commands of the first type; and and for each bit position in the temporary mask which is assigned the second value, determining that a corresponding bit of the address of the command of the second type matches regardless of the accumulated information from the received commands of the first type.

* * * * *